May 28, 1968 SHICHIRO FUKATSU 3,384,968

APPARATUS FOR DETECTING AND INDICATING AMOUNT OF TAPE

Filed June 4, 1965

INVENTOR

Shichiro Fukatsu

BY Stevens, Davis, Miller & Mosher

ATTORNEYS

United States Patent Office 3,384,968
Patented May 28, 1968

3,384,968

APPARATUS FOR DETECTING AND INDICATING AMOUNT OF TAPE

Shichiro Fukatsu, Yokohama, Japan, assignor to Victor Company of Japan, Limited, Yokohama, Japan, a corporation of Japan
Filed June 4, 1965, Ser. No. 461,437
Claims priority, application Japan, June 11, 1964, 39/45,915
4 Claims. (Cl. 33—129)

ABSTRACT OF THE DISCLOSURE

An apparatus for detecting and indicating an amount of tape wound on a reel comprising a lever pivotally mounted adjacent said reel and having a roller disposed thereon in engagement with the outer periphery of said tape so that said lever pivots in response to changes in the outer diameter of said tape. An endless rope tensioned by a spring at the connecting part thereof is also provided along with means for magnifying and transmitting the amount of movement of said lever to said rope for moving said rope. An indicating needle fixed to the linear portion of said rope is adapted to move linearly with the motion of said rope over an indicating scale plate.

Figures 1, 2:
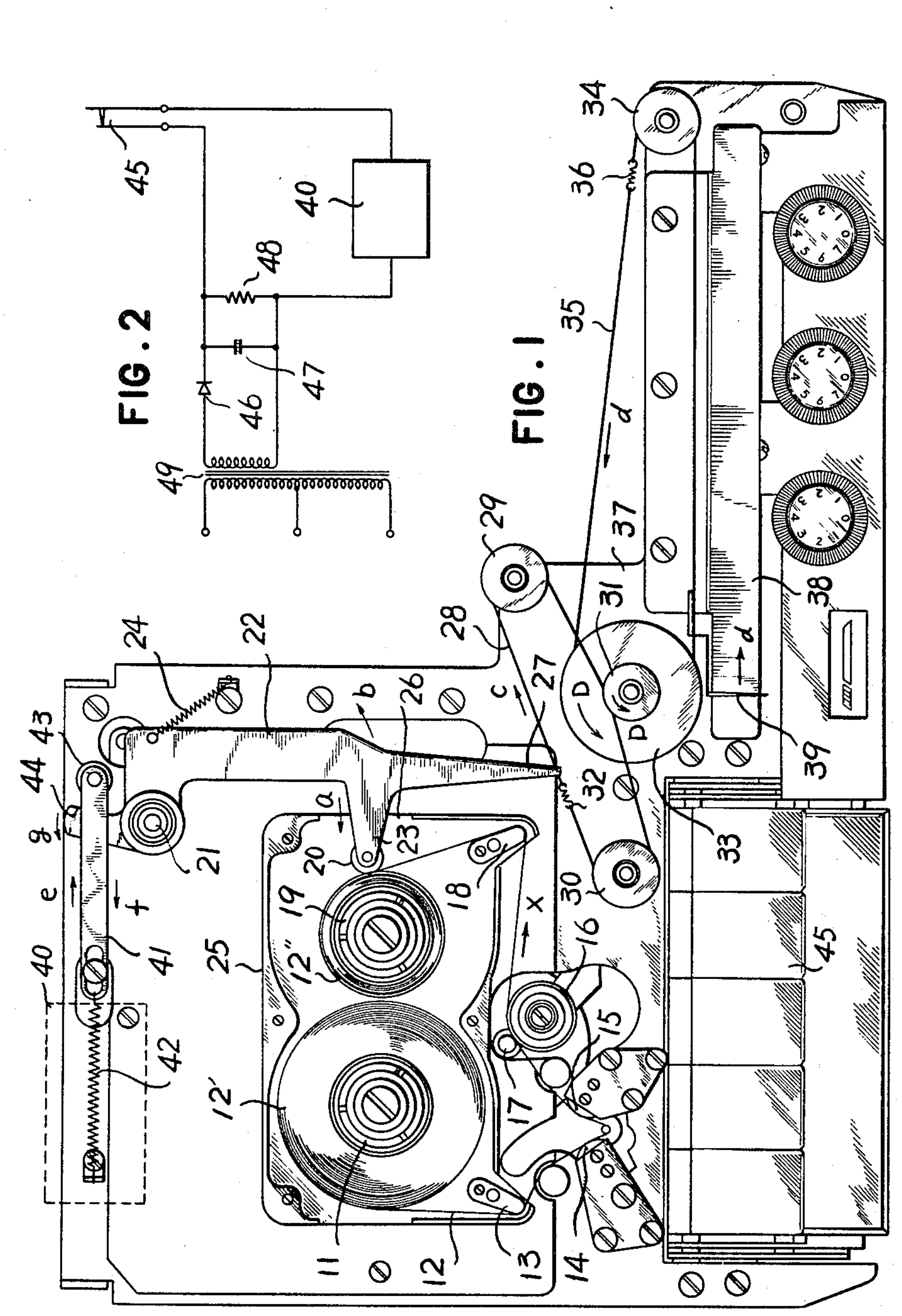

The present invention relates to an apparatus for detectiing and indicating amount of tape, especially to an apparatus for detecting and indicating amount of tape of a miniature magnetic tape recorder such as tape cartridge system etc.

An apparatus for detecting and indicating amount of tape taken up on a reel in a conventional tape recorder comprises, for example, a counter for indicating a number of revolutions in numeral corresponding to the number of revolutions of the reel, or a device for detecting the amount of tape by a lever in contact with the tape taken up on the take up reel and indicating it on an arcuate scale plate by said lever. But in the former counter, it does not move in a direction of decreasing of the amount of tape, for example, in a direction of back winding of tape etc. and is unable of returning to zero automatically. In a latter apparatus for detecting and indicating, as an indicating plate is formed in circular arc, it is necessary to provide a large fan shaped area to move an indicating needle, so that it can not be used especially in the miniature tape recorder such as tape cartridge type etc., and these are defects.

The present invention is to obviate these defects of the conventional apparatus described above.

A principal object of the present invention is to obtain a novel and useful apparatus for detecting and indicating the amount of tape which detects the amount of tape taken up on the reel of the tape recorder and indicates it on linear scale.

Another object of the present invention is to obtain a novel and useful apparatus for detecting and indicating the amount of tape which detects the increase and decrease of the amount of tape taken up on the reel of the tape recorder and indicates it on a linear scale.

Still another object of the present invention is to obtain a novel and useful apparatus for detecting and indicating the amount of tape which can reduce an area necessary for a detecting and indicating means.

Further object of the present invention is to present an apparatus for detecting and indicating the amount of tape in which detachment of a tape cartridge can be facilitated by moving a lever for detecting the amount of tape when the running of tape is stopped in a tape recorder of tape cartridge type.

Still further object and feature of this invention will be apparent from a reading of following description taken in conjunction with the accompanying drawings in which:

FIG. 1 is a plan view partly cut showing one embodiment of the present invention; and FIG. 2 shows one embodiment of an electrical circuit applicable to a part of the apparatus according to the present invention.

Referring to the drawings, in FIG. 1, 11 is a supply reel, 12′ is a magnetic tape portion taken up around said reel and a magnetic tape 12 taken out of said reel is guided by a tape guide 13 and contacts to a magnetic erasing head 14 and a magnetic recording and reproducing head 15, and is pressed to a capstan 17 by a pinch roller 16, and is moved round by said capstan in a direction marked arrow *x*. Said tape 12 is taken up by a take up reel 19 after guided by a guide 18. 12″ is a tape portion taken up on said take up reel. A roller 20 is always in contact with the taken up tape and is designed to be rotatable at a protruding part 23 of a lever 22 which is rotatably supported by a shaft 21 in order to decrease the friction to the tape. Further, said protruding part 23 receives always the force in direction of an arrow mark *a* by means of a spring 24, and the roller 20 is always in contact with the outer periphery of the tape portion 12″. 25 is a tape cartridge encasing the supply reel 11, take up reel 19 and tape portions 12′, 12″ and the protruding part 23 of said lever is inserted in said cartridge from a window 26. 27 is an end portion of said lever where a rope 28 is taken up in such a way that it may not be slipped. Said rope 28 is supported by the stationary or rotary rollers 29 and 30, having small coefficient of frictional resistance of the contact surface with said rope, and is taken up by one turn on a roller 31 having great coefficient of frictional resistance of the contact surface with said rope, both ends of said rope being connected via a spring 32, and is formed in a loop. A roller 33 is coaxial with the roller 31 and rotatable therewith, and the diameter of said roller is larger than that of the roller 31. A roller 34 is arranged some distance spaced from said roller 33. A rope 35 is looped over said both rollers 33 and 34 and has a straight line part and both ends thereof are connected by a spring 36. Further, each of said rollers 29, 30, 33 and 34 is provided on a common chassis 37. 38 is a linear scale plate attached to said chassis. 39 is an indicating needle fixed to the rope 35 and moves on the scale plate corresponding to the movement of the rope.

Next, the state of operation of each device constructed as described above will be explained.

The tape 12 delivered from the supply reel 11 is taken upon the take up reel 19, and the diameter of the tape portion 12″ taken up in succession is increased and such state is explained as follows:

Following the increase of the diameter of said tape portion 12″, the roller 20 mounted on the protruding part 23 of the lever 22 is moved in a direction shown by an arrow mark *b* against the force of the direction shown by an arrow mark *a* given by the spring 24 because said roller 20 is always in contact with the outer periphery of the tape portion 12″. Annular rope 28 is moved in a direction shown by an arrow mark *c* via the end 27 of the lever by means of the movement in the direction *b*. Further, as a point at which the rope 28 is connected to said end 27 travels along the locus of circular arc, variation by means of this annular movement is absorbed by the extension and contraction of the spring 32. The roller 31 is rotated in a direction shown by an arrow mark D by means of the movement of said rope 28 in the direction *c*, and the roller 33 constructed coaxial and integral with said roller 31 is rotated in the direction D. As a result, the rope 35 moves in the direction D. Further, in this case, as the diameter the roller 33 is constructed to be larger than that of the roller 31, the amount of movement of the rope 28 is magnified corresponding to the ratio of both diameters and it is shown as the amount of movement of the rope 35. For example, when the diameter of the roller 31 is 6 mm. and the diameter of the roller 38 is 15 mm., then it is magnified by 2.5 multiplication. In this way, when the rope 35 moves in the direction *d*, the indicating needle 39 attached and fixed to said rope also moves in the direction *d* linearly. Accordingly, by means of the operation as described above, magnified amount of the tape portion 12″ taken up is indicated on the linear scale plate 38 by the indicating needle 39 in accordance with the amount of taken up tape. Further, as the protruded part 23 of the lever receives always the force in the direction of the arrow mark *a* by the spring 24 when the diameter of the tape portion 12″ becomes smaller in case of back winding of the tape, said protruded part is always in contact with the outer periphery of the tape portion 12″ via the roller 20, and each part described above operates respectively in the reverse directions to the arrow marks *b*, *c* and *d*, and thus the indicating needle indicates always the correct amount of the tape portion 12″.

Next, the running operation of the tape of the tape recorder when it stops is explained referring to FIGS. 1 and 2.

40 is a plunger. 41 is a movable lever in the directions shown by the arrow marks *e* and *f* by means of said plunger. 42 is a spring mounted at one end of said lever and for affording a power to said lever in the direction *e*. 43 is a roller mounted at the other end of said lever. 44 is an arm provided on said lever 22. 45 is a push button switch for stopping the running of the tape. 46 is a rectifier for an electric source. 47 is a capacitor having the capacity of 1000 $\mu$f. 48 is a resistance of 27 k$\Omega$ for stabilizing the voltage. 49 is a transformer. Now, when the push button switch 45 for stopping the running of the tape is pushed, running of the tape is stopped and at the same time (explanation of the means for stopping the running of the tape is omitted) the voltage is stepped down to 24 v. by means of the transformer 49 and the current of 0.4 ma. is rectified by the rectifying circuit composed of the rectifier 46 and capacitor 47 and the plunger 40 is operated. When said plunger operates, the movable lever 41 moves in the direction marked arrow *f* and the roller 43 attached to the end of said lever rotates the arm 44 in a direction shown by an arrow mark *g*. When said arm is rotated in the direction *g*, the protruded part 23 of the lever 22 is rotated in the direction *b*, and said protruded part 23 inserted in the cartridge 25 comes out of said cartridge and thus said cartridge can be inserted and taken out freely. Further, when the tape is carried in state of play, operation of said plunger 40 disappears and the movable lever 41 moves in the direction *e* by means of the force of the spring 42 and the engagement between the roller 43 and the arm 44 is free and the protruded part 23 of the lever rotates in the direction *a* by means of the force of the spring 24 and is carried in contact with the outer periphery of the tape portion 12″ again.

In general, the amount of tape taken up or taken out is not proportional to the variation of diameter of tape portion 12. Namely, when the tape wound on the reel has a small diameter, the variation in diameter is relatively large upon rotation of the reel, and becomes progressively smaller as the diameter increases. Therefore, when the roller 33 is of a circular shape, a uniformly divided scale for indicating the amount of tape on the reel is inaccurate. However, when the roller 33 is formed into a noncircular shape, for example, in the shape of an eccentric cam such that said unequal intervals may be corrected, an accurate reading can be obtained.

The present invention is not limited to the embodiment described above, for example, the end of the lever for detecting the amount of the tape may abut against the tape on the side of the supply reel, of course it should be understood that various modifications may be made without departing from the scope of the present invention.

What I claim is:

1. An apparatus for detecting and indicating an amount of tape wound on a reel comprising a lever pivotally mounted adjacent said reel, a roller provided on said lever and engaging the outer periphery of said tape, resilient means urging said roller into engagement with the outer periphery of said tape so that said lever pivots in response to changes in the outer diameter of said tape, an endless rope tensioned by a spring at the connecting part thereof and having a linear portion, means for magnifying and transmitting the amount of movement of said lever to said rope for moving said rope, an indicating needle fixed to the linear portion of said rope and movable linearly with the motion of said rope, and a scale plate over which said indicating needle moves.

2. An apparatus for detecting and indicating an amount of tape wound on a reel, comprising a lever mounted adjacent said reel and movable in response to changes in the outer diameter of said tape, a first endless rope tensioned by a spring at the connecting part thereof and movable in response to the movement of said lever, a second endless rope tensioned by a spring at the connecting part thereof and having a linear portion, means for magnifying and transmitting the amount of movement of said first rope to said second rope for moving said second rope, an indicating needle fixed to said linear portion of said second rope and movable linearly with the motion of said second rope, and a scale plate over which said indicating needle moves.

3. An apparatus for detecting and indicating an amount of tape wound on a reel comprising a lever pivotally mounted adjacent said reel, resilient means urging said lever and the outer periphery of said tape into engagement so that said lever pivots in response to changes in outer diameter of said tape, a first endless rope tensioned by a spring at the connecting part thereof and movable in response to the movement of said lever, a second endless rope tensioned by a spring at the connecting part thereof and having a linear portion, means for magnifying and transmitting the amount of movement of said first rope to said second rope for moving said second rope, and means for indicating the movement of said second rope.

4. A tape cartridge type tape recorder in which a tape supply reel and a tape take-up reel are encased in a cartridge, and the tape is delivered from the supply reel outwardly from said cartridge, over recording and reproducing means, into said cartridge, and onto said take-up reel, wherein the improvement comprises an apparatus for detecting and indicating an amount of tape wound on one of said reels comprising a lever having a portion extending into said cartridge and being pivoted at one end thereof, a roller provided on said portion of said lever and engaging the outer periphery of the tape on one of said reels so that said lever pivots in response to changes in the outer diameter of said tape, means for inserting and removing said portion of said lever into and from said cartridge, an endless rope tensioned by a spring at the connecting part thereof and having a linear portion, means for magnifying and transmitting the amount of movement of said lever to said rope for moving said rope, an indicating needle fixed to the linear portion of said rope and movable linearly with the motion of said rope, and a scale plate over which said indicating needle moves.

References Cited

UNITED STATES PATENTS

| | | | |
|---|---|---|---|
| 1,279,703 | 9/1918 | James | 33—172 |
| 2,033,713 | 3/1936 | Hughey | 33—172 |
| 2,884,788 | 5/1959 | Clark | 74—89.22 |

LEONARD FORMAN, *Primary Examiner.*

F. J. D'AMBROSIO, *Assistant Examiner.*